US010934974B2

(12) United States Patent
Gruenberger et al.

(10) Patent No.: US 10,934,974 B2
(45) Date of Patent: Mar. 2, 2021

(54) MIXING DEVICE FOR A FUEL INJECTION SYSTEM OF AN INTERNAL COMBUSTION ENGINE

(71) Applicant: Dr. Ing. h.c. F. Porsche Aktiengesellschaft, Stuttgart (DE)

(72) Inventors: Joachim Gruenberger, Sachsenheim (DE); Hartmut Voss, Wimsheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/696,090

(22) Filed: Nov. 26, 2019

(65) Prior Publication Data

US 2020/0166007 A1 May 28, 2020

(30) Foreign Application Priority Data

Nov. 27, 2018 (DE) ...................... 10 2018 129 954.0

(51) Int. Cl.
| | | |
|---|---|---|
| *F02M 25/022* | (2006.01) | |
| *B01F 5/04* | (2006.01) | |
| *B60K 15/03* | (2006.01) | |
| *F01P 3/02* | (2006.01) | |

(Continued)

(52) U.S. Cl.
CPC ....... *F02M 25/0228* (2013.01); *B01F 5/0405* (2013.01); *B01F 5/0471* (2013.01); *B60K 15/03* (2013.01); *F01P 3/02* (2013.01); *F02M 25/0225* (2013.01); *F02M 37/18* (2013.01); *F02M 61/14* (2013.01); *B01F 2215/0088* (2013.01); *B60K 2015/03098* (2013.01); *F01P 2003/021* (2013.01)

(58) Field of Classification Search
CPC ........... F02M 25/0228; F02M 25/0225; F02M 37/18; F02M 61/14; F02M 25/025; B01F 5/0405; B01F 5/0471; B01F 2215/0088; B60K 15/03; B60K 2015/03098; F01P 3/02; F01P 2003/021
See application file for complete search history.

(56) References Cited

U.S. PATENT DOCUMENTS 5,823,149 A * 10/1998 Mezheritsky ........... F02B 75/08
123/25 A

FOREIGN PATENT DOCUMENTS

| DE | 44 14 488 | 3/1995 |
|---|---|---|
| DE | 10 2011 076 669 | 12/2012 |
| DE | 10 2011 076 670 | 12/2012 |

(Continued)

OTHER PUBLICATIONS

German Office Action dated Nov. 8, 2019.

*Primary Examiner* — Jacob M Amick
(74) *Attorney, Agent, or Firm* — Gerald E. Hespos; Michael J. Porco; Matthew T. Hespos

(57) ABSTRACT

A fuel injection system (4) for an internal combustion engine has a low-pressure pump for delivering fuel from a fuel tank. The fuel is fed upstream of an injector (11) of the fuel injection system (4) to a mixing device (14). The mixing device (14) has a mixer housing (18) with a fuel connection (15) for receiving fuel and with at least one coolant connection (17; 28; 33) for receiving a coolant. For the purpose of bringing about efficient mixing of the fuel and the coolant, before a collision of a fuel jet (40) of the fuel and a coolant jet (41) of the coolant, the two fluid jets (40, 41) are formed to be at least partially aligned in the same direction.

13 Claims, 4 Drawing Sheets

(51) Int. Cl.
 *F02M 37/18* (2006.01)
 *F02M 61/14* (2006.01)

(56) References Cited

FOREIGN PATENT DOCUMENTS

| EP | 2 208 879 | 7/2010 |
|---|---|---|
| EP | 2 543 869 | 1/2013 |
| WO | 2010/0064302 | 6/2010 |

* cited by examiner

MIXING DEVICE FOR A FUEL INJECTION SYSTEM OF AN INTERNAL COMBUSTION ENGINE

CROSS REFERENCE TO RELATED APPLICATION

This application claims priority under 35 USC 119 to German Patent Appl. No. 10 2018 129 954.0 filed on Nov. 27, 2018, the entire disclosure of which is incorporated herein by reference.

BACKGROUND

Field of the Invention

The invention relates to a mixing device for a fuel injection system of an internal combustion engine.

Related Art

Mixing devices for fuel injection systems for internal combustion engines are known. The mixing device functions to mix a fuel required for the operation of the internal combustion engine with a coolant for cooling a combustion and cylinder chamber of the internal combustion engine. Water generally is used for cooling. The water cooling is used in upper load and rotational speed ranges of the internal combustion engine due to high pressure and temperature in the combustion chamber during these operational ranges. Coolants other than water can be mixed with fuel for these purposes.

The fuel is delivered from a fuel tank with the aid of a pump, normally a low-pressure pump. The fuel is fed to the mixing device via a fuel line and is enriched in the mixing device with the coolant. Subsequently, the fuel-coolant mixture is fed to a high-pressure pump that delivers the fuel-coolant mixture at high pressure to the injectors for injection into the combustion chamber.

DE 10 2011 076 670 A1 and DE 10 2011 076 699 A1 each present a mixing device for a fuel injection system of an internal combustion engine. The mixing device is arranged upstream of a high-pressure pump of the fuel injection system. The high-pressure pump feeds the fuel-water mixture at a high injection pressure to the internal combustion engine. Similar arrangements also are shown in WO 2010/064302 A1, EP 2 208 879 A1 and EP 2 543 869 B1.

Highly effective mixing of the fuel with the coolant is needed for high efficiency combustion of the fuel-coolant mixture in the internal combustion engine. This can be achieved by a specific arrangement of the fluids with respect to one another before the collision thereof.

It is thus an object of the invention to provide a mixing device that can bring about improved mixing of fuel and coolant for a fuel injection system of an internal combustion engine.

SUMMARY

A mixing device is provided for a fuel injection system of an internal combustion engine. The fuel injection system has a low-pressure pump for delivering fuel from a fuel tank to a mixed housing of a mixing device that is upstream of an injector of the fuel injection system. The mixer housing has a fuel connection through which fuel can flow and a coolant connection through which coolant can flow. According to the invention, a fuel jet of the fuel and a coolant jet of the coolant are formed to align partially in the same direction to bring about efficient mixing of the fuel and the coolant before a collision of the fuel jet and the coolant jet of the coolant. The advantage is highly effective and stable mixing of the two fluids. The fact that no complete unidirectional alignment direction is formed means that, owing to the jet components formed perpendicular to the unidirectional alignment direction, swirling is generated and brings about improved mixing. With the aid of the jet components aligned in the same direction, it is possible to realize both effective and stable mixing, since the mixed fluids flow in the same flow direction.

In one configuration of the mixing device, a longitudinal axis of a passage opening, having the fuel connection, of the mixer housing, which has a coaxially formed nozzle for the outflow of the fuel-coolant mixture, and an opening longitudinal axis of a receiving opening, receiving the coolant connection, of the mixer housing are arranged at an acute angle to one another in the flow direction of the fluid jets. In this way, improved mixing is realized with improved stability of the fuel-coolant mixture. Depending on the value of the acute angle, it is possible for the jet components aligned in the same direction to be enlarged, wherein, in particular for a value of 15° to 30° of the angle, a particularly stable fuel-coolant mixture, also referred to as emulsion, is able to be achieved.

In a further configuration of the mixing device, prior to a collision against the fuel, a pressure of the coolant is higher than a pressure of the fuel. Thus, the highly effective mixing of the fuel-coolant mixture and the stability thereof can be improved since the coolant can be atomized more finely due to the higher pressure.

An opening-in point is defined where the coolant from the receiving opening enters into the passage opening of the fuel. A first spacing from an outflow opening of the fuel connection to the opening-in point is larger than a second spacing from an injector end of an injector of the coolant connection to the opening-in point. This relative spacing achieves a further improved emulsion, since the fuel jet, in particular in an embodiment of at least two coolant connections, collides against pre-swirled coolant jets. For this purpose, the injector end may be directly at the opening-in point.

Multiple coolant connections may be provided and may be formed symmetrically over a periphery of the mixer housing to achieve further improvement of the emulsion.

The mixing device may be arranged in the fuel injection system upstream of a high-pressure line, or in a high-pressure pump upstream of a high-pressure line. The high-pressure pump generates a further pressure increase of the emulsion and causes additional swirling and mixing of the fluid parts.

The mixing device may be configured for delivery of the fuel that is regulated on the basis of requirement. Thus, fuel may be injected into cylinders of the internal combustion engine in a requirement-dependent manner. Similarly, the coolant can be injected into the mixing device in a requirement-dependent manner, and thus injected into the cylinder as emulsion. This leads to advantageous regulation of the mixing device since the coolant can be fed to the internal combustion engine at high loads over a greater rotational speed range.

A part of the mixing device with a passage opening for the fuel connection may have a first cross section and the mixing chamber may have a second cross section that is larger than the first cross section. Thus, the cross section of the mixing chamber is larger than the cross section with the passage opening in which the fuel flows in. Accordingly, a flow speed of the fuel in the passage opening is reduced upon entry into the mixing chamber due to the larger cross section of the mixing chamber. Therefore, the coolant can be injected into the mixing chamber over a large area and in a very fine form, which results in highly effective mixing of the two fluids.

An area of the mixing device associated with a nozzle arranged at a first end of the mixing device may have a third cross section that is smaller than the second cross section of the mixing device that exists in the mixing chamber. The reduction to the third cross section leads to an increase in the flow speed and counteracts de-mixing that may occur upstream of the high-pressure pump due partly to a reduced flow speed of the fuel.

The cooling fluid may be water because of its low costs and good cooling effect due to a high evaporation enthalpy.

Further advantages, features and details of the invention will emerge from the following description of exemplary embodiments and from the drawings. The features and combinations mentioned above and those described below and/or shown in the figures can be used in the specified combination and also in other combinations or individually without departing from the scope of the invention. Identical or functionally identical elements are denoted by identical reference signs.

DETAILED DESCRIPTION OF THE DRAWINGS

DETAILED DESCRIPTION

Figure 1:
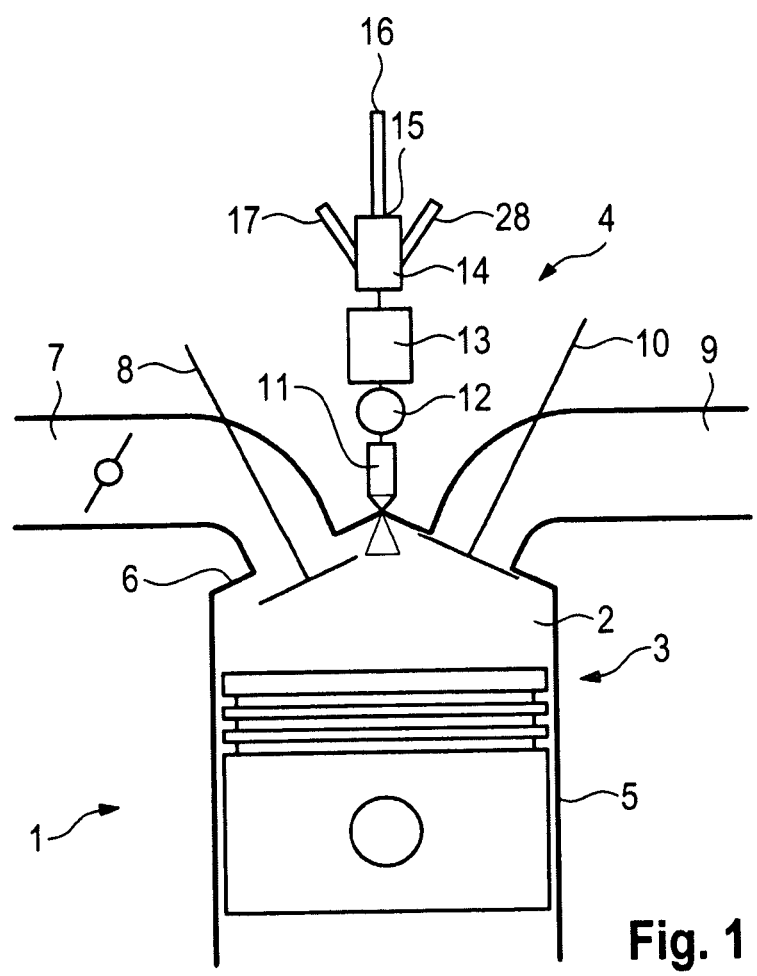
FIG. 1 is a basic illustration, a cylinder with a combustion chamber of an internal combustion engine with a fuel injection system having a mixing device according to the invention.

FIG. 1 illustrates a cylinder 1 with a combustion chamber 2 of an internal combustion engine 3 with a fuel injection system 4. The cylinder 1 is formed in a crankcase 5 of the internal combustion engine 3, and the combustion chamber 2 is formed in a cylinder head 6 of the internal combustion engine 3. At least one inlet duct 7 is connected to the cylinder head 6 in an adjoining manner and has an inlet valve 8 via which combustion air can flow into the cylinder 1 and the combustion chamber 2. The cylinder head 6 also has at least one outlet duct 9 with an outlet valve 10 via which exhaust gas formed during combustion of the combustion air with fuel or with a fuel-water emulsion is able to flow out when the outlet valve 10 is opened.

The fuel or the emulsion is injected into the combustion chamber 2 with the aid of an injector 11 of the fuel injection system 4. The injector 11 also can be referred to as an injection nozzle. The injector 11 is arranged on a high-pressure line 12 so as to be able to be flowed through by way of the latter. The high-pressure line 12 is filled with fuel, or with the emulsion, with the aid of a high-pressure pump 13 of the fuel injection system 4 that is positioned upstream of the injector 11. A mixing device 14 of the fuel injection system 4 is arranged upstream of the high-pressure pump 13 and accommodates a flow generated by the high-pressure pump 13. The mixing device 14 has a fuel connection 15 that is connected to a fuel line 16 opening into a fuel tank (not illustrated in more detail) of the internal combustion engine 3 and can accommodate a flow of fuel. A low-pressure pump (not illustrated in more detail) of the fuel injection system 4 is upstream of the mixing device 14 and delivers fuel from the fuel tank. The mixing device 14 of this first embodiment has a first coolant connection 17 and a second coolant connection 28.

Figure 2:
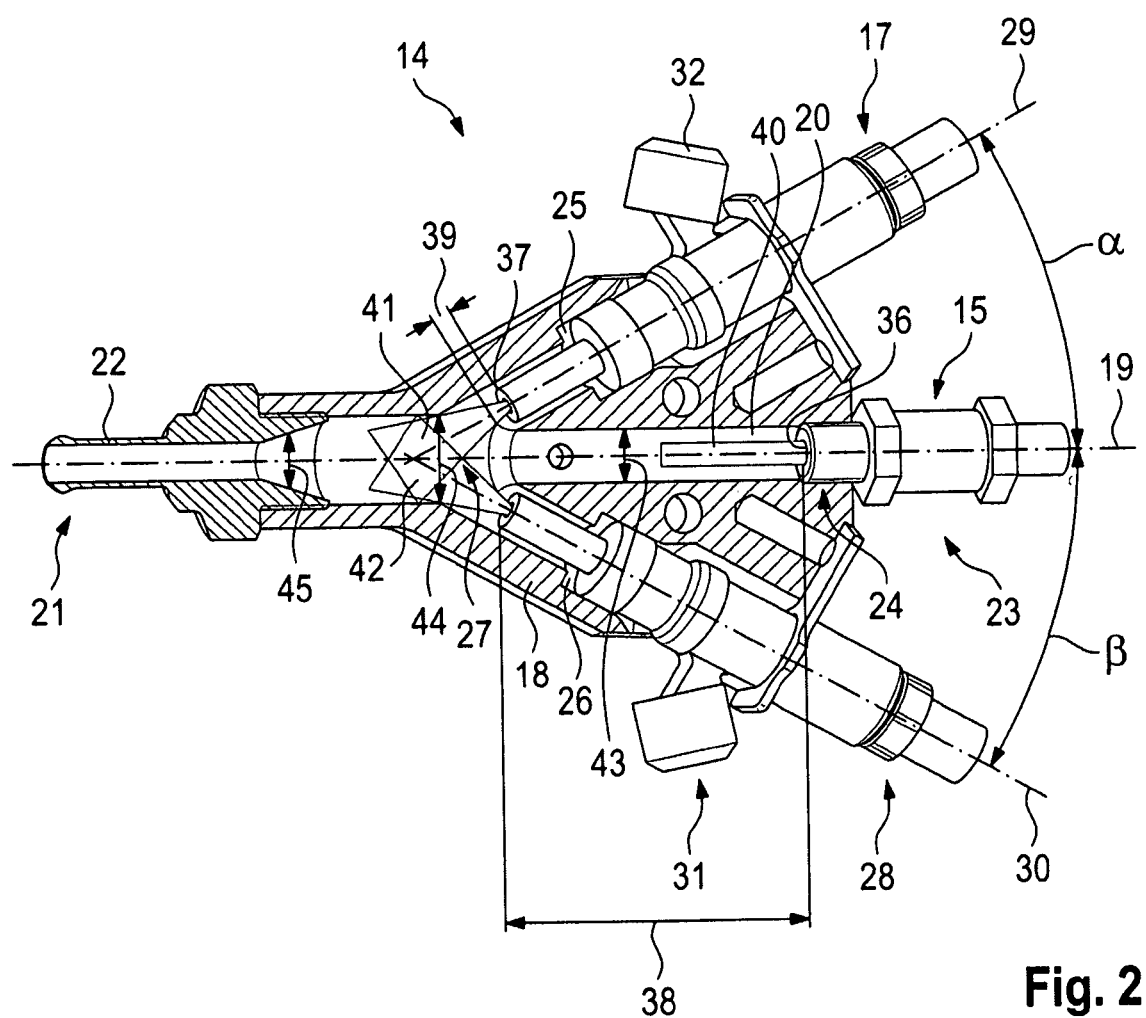
FIG. 2 is a perspective partial section of the mixing device.
Figure 3:
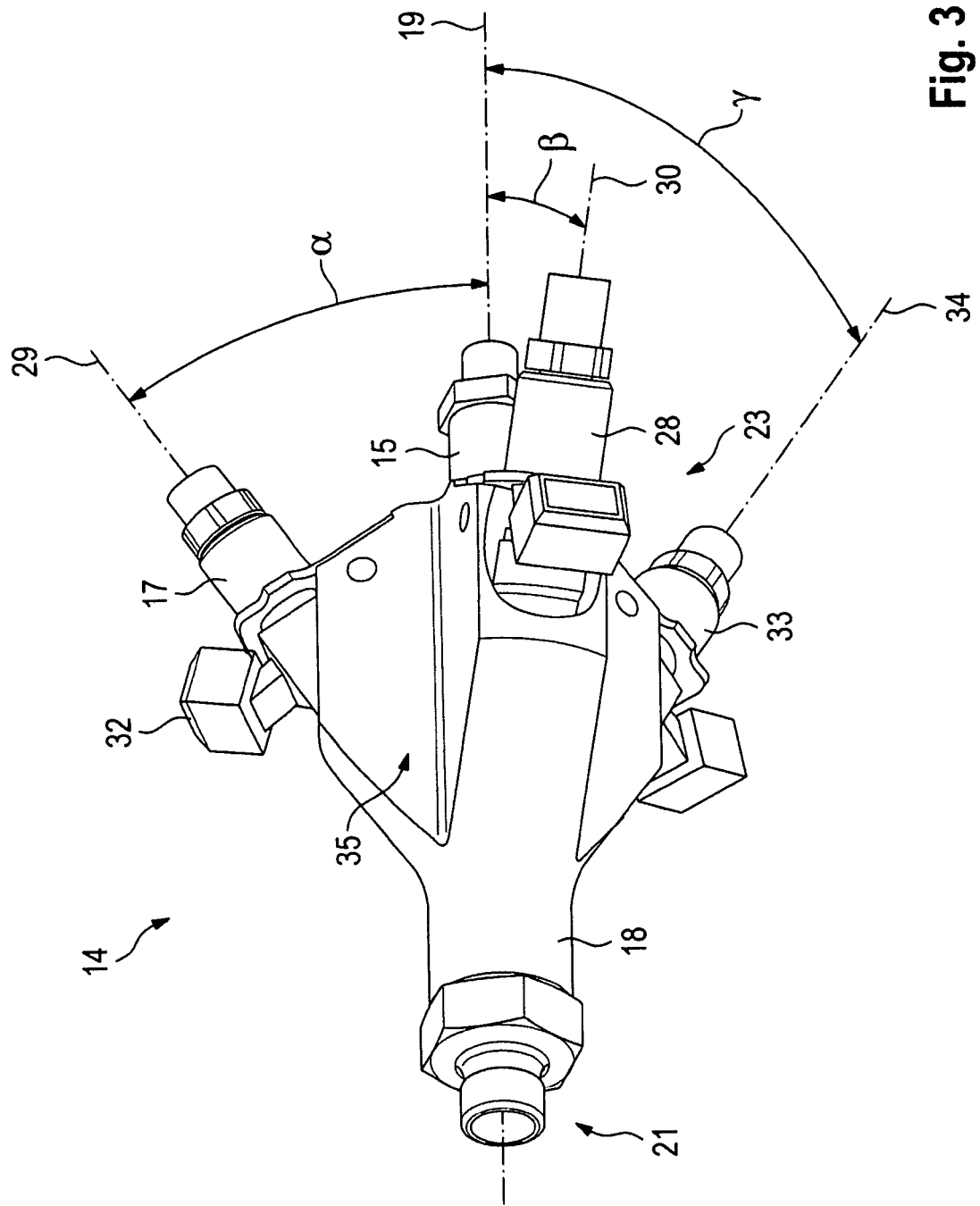
FIG. 3 is a perspective illustration of the mixing device according to a second embodiment.

The mixing device 14 of the first embodiment is illustrated in FIG. 2 and has two coolant connections 17, 28. The mixing device 14 of the second embodiment is illustrated in FIG. 3 and has three coolant connections 17, 28, 33.

The mixing device 14 comprises a mixer housing 18 with a passage opening 20 extending along its longitudinal axis 19. The passage opening 20 is illustrated as a bore but could be produced in some other manner.

The mixer housing 18 has a first end 21 that faces the cylinder head 6. A nozzle 22 is formed at the first end 21, and the passage opening 20 is open into and coaxial with the nozzle 22. The mixer housing 18 also has a second end 23 that faces away from the first end 21. The second end 23 is designed for immovably receiving the fuel connection 15 so that fuel can flow into the mixer housing 18 coaxially with the passage opening 20. The fuel connection 15, preferably a check valve, is received with the aid of a thread on the mixer housing 18. The passage opening 20 of the mixer housing has a receiving section 24 formed in a manner complementary to the thread for force-fitting and form-fitting connection to the fuel connection 15. An end of the fuel connection 15 that faces the nozzle 22 has an outflow opening 36 via which the fuel can flow from the fuel line 16 into the passage opening 20.

A first receiving opening 25 and a second receiving opening 26 are formed in the mixer housing 18 and open into the passage opening 20. An opening-in point 27 is formed upstream of the nozzle 22. The opening-in point 27 is of chamber-like form due to the opening of the receiving openings 25, 26 into the passage opening 20.

The first coolant connection 17 is received into the first receiving opening 25, and the second coolant connection 28 is received into the second receiving opening 26, so as to be immovable. The two coolant connections 17, 28 are designed for throughflow by water, but could be designed for throughflow by other coolants.

The first receiving opening 25 has a first opening longitudinal axis 29 that is arranged at an acute first angle α to the longitudinal axis 19 in the flow direction of the coolant, thus as viewed in the direction of the opening-in point 27 from the first coolant connection 17. The second receiving opening 26 has a second opening longitudinal axis 30 that is formed at an acute second angle β to the longitudinal axis 19, with the second angle β corresponding to the first angle α in this embodiment. The angles α, β do not need to be identical but, for realizing a preferred mixture of the fuel and the coolant, the angle α, β should be in the form of an acute angle, preferably having a value of 45°, in particular preferably 15-30°.

The coolant connections 17, 28 have at their connection ends 31 formed so as to face the opening-in point 27 further injectors 32, which are provided for atomizing the coolant. Furthermore, the further injectors 32 are designed for opening and closing their throughflow openings (not illustrated in more detail), via which the coolant, proceeding from the coolant connection 17; 28, can flow into the opening-in point 27. The injectors are designed for electronic regulation. It is thereby possible, in a manner dependent on an electronic pulse, for the throughflow opening to be closed or opened, and for the coolant to be injected independently of the fuel.

The injector ends 37 of the further injectors 32 are arranged to face the nozzle 22. Thus, both a fuel jet 40 of the fuel and a coolant jet 41 of the coolant, in terms of their flow direction, are formed to be partially aligned in the same direction before a collision at the opening-in point 27. What is to be understood in this context is not co-axial orientation but rather a flow direction that is at least partially oriented in the direction of the nozzle 22. In this regard, the fuel has a flow direction that is formed to be coaxial with the nozzle 22. The coolant has a flow direction component in the direction of the nozzle 22—and thus coaxial with the nozzle 22—and a flow component perpendicular to the longitudinal axis 19. The longitudinal axis 19 is coaxial with the nozzle 22.

A first spacing 38 from the outflow opening 36 of the fuel connection 15 to the opening-in point 27 of the receiving openings 25, 26 having the coolant connections 17, 28 is larger than a second spacing from the injector ends 37 to the opening-in point such that the colliding coolant jets 41, before a collision of the fuel jet 40, already are able to form a swirled mixture against which the fuel jet 40 can collide and pass through.

The mixing device 14 of the second embodiment has a third coolant connection 33, as is illustrated in FIG. 3. The third coolant connection 33 is assigned a third receiving opening (not illustrated in more detail) with a third opening longitudinal axis 34 that is arranged at a third angle y' to the longitudinal axis 19.

Over its periphery, the mixer housing 18 has, in an installation space-optimized manner, cutouts 35 between the coolant connections 17, 28, 33 arranged and distributed symmetrically over its periphery. The cutouts can receive components of the internal combustion engine 3.

The mixing device 14 may optionally be arranged in the high-pressure pump 13. A further arrangement of the mixing device 14 is possible downstream of the high-pressure pump 13 and upstream of the high-pressure line 12. For this purpose, the high-pressure pump 13 is connected to accommodate a flow through to the fuel connection 15, and the nozzle 22 is received in the high-pressure line 12.

For the purpose of realizing efficient mixing of the fuel and the coolant, the fuel is injected at a lower pressure than the coolant is. In this regard, by way of example, in one exemplary embodiment, the fuel is injected at a pressure of 6 bar and the coolant is injected at a pressure of 10 bar. Owing to the higher pressure, the coolant is atomized more finely to achieve improved mixing of the fuel and the coolant.

For improved mixing, a mixing chamber 42, which is formed upstream of the nozzle 22, has a preferred geometry for reducing a flow speed of the fuel. Based on a first cross section 43 of the passage opening 20, at the opening-in point 27, the mixing chamber 42 has a significantly larger second cross section 44. Thus, the flow speed of the fuel is reduced and the coolant jet 41 can, over a large area and in a fine form, undergo collision with the fuel jet 40 and/or upstream of the fuel jet 40 so that particularly good mixing is brought about.

A third cross section 45 of the mixing device 14 is associated with the nozzle 22 and is smaller than the second cross section 44 such that the flow speed of the mixture or of the emulsion can be increased. Thus, it is possible to avoid de-mixing of the fluids upstream of the high-pressure pump. In particular, the third cross section 45 of the nozzle 22 is reduced at least sectionally in the direction of the first end 21 along the longitudinal axis 19. Accordingly, the nozzle 22 may have a conically formed opening whose cross section, the third cross section 45 at the nozzle 22 is of tapering form in the direction of an outlet and facing away from the mixing chamber 42.

The mixing device 14 can be used both for permanent delivery of the fuel and for delivery of the fuel that is regulated on the basis of requirement.

Figure 4:
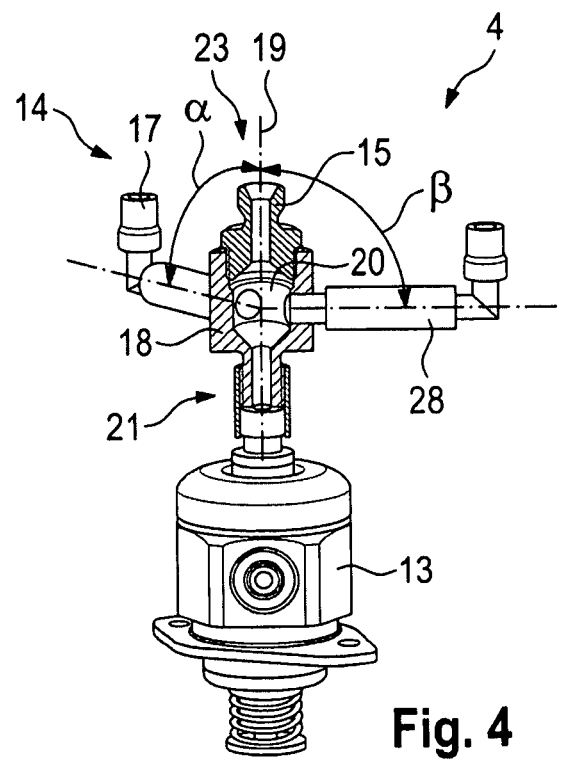
FIG. 4 is a perspective half-section of a mixing device according to a third embodiment.
Figure 5:
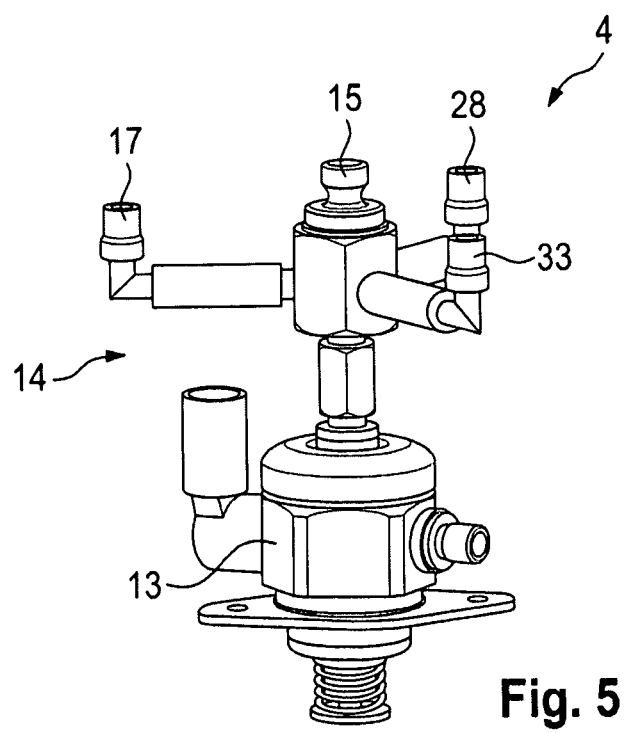
FIG. 5 is a perspective illustration of the mixing device of FIG. 4.

FIGS. 4 and 5 illustrate the mixing device 14 according to the invention in a third exemplary embodiment, wherein the angles α, β, y' are formed to be almost orthogonal to the longitudinal axis 19, the coolant jets 41 still however having a flow component in the direction of the longitudinal axis 19.

The mixing device 14 may also have more than one fuel connection 15.

What is claimed is:

1. A mixing device for a fuel injection system of an internal combustion engine, the fuel injection system having a low-pressure pump for delivering fuel from a fuel tank to the mixing device and subsequently to an injector of the fuel injection system, the mixing device comprising: a mixer housing with a mixing chamber for mixing the fuel with a coolant, the mixing housing having a nozzle for an outflow of a fuel-coolant mixture mixed in the mixing chamber, a fuel connection for receiving the fuel, the fuel connection having a passage opening with a longitudinal axis that is coaxial with the nozzle for the outflow of the fuel-coolant mixture, and at least two coolant connections for receiving the coolant, the mixer housing being configured so that a fuel jet of the fuel and coolant jets of the coolant from the coolant connections enter the mixing chamber of the mixer housing at least partially aligned in a common direction with each of the coolant jets being aligned to the fuel jet at an acute angle of less than 45° to bring about efficient mixing of the fuel and the coolant as a fuel-coolant mixture before a collision of the fuel jet of the fuel and the coolant jet of the coolant in a mixing chamber.

2. The mixing device of claim 1, wherein the angle has a value between 15° and 30°.

3. The mixing device of claim 1, wherein prior to a collision against the fuel, a pressure of the coolant is higher than a pressure of the fuel.

4. A mixing device for a fuel injection system of an internal combustion engine, the fuel injection system having a low-pressure pump for delivering fuel from a fuel tank to the mixing device and subsequently to an injector of the fuel injection system, the mixing device comprising: a mixer housing with a fuel connection for receiving fuel, and at least one coolant connection for receiving a coolant, the mixer housing having a mixing chamber configured so that a fuel jet of the fuel and a coolant jet of the coolant in the mixing chamber of the mixer housing are at least partially aligned in a common direction in the mixing chamber to bring about efficient mixing of the fuel and the coolant as a fuel-coolant mixture before a collision of the fuel jet of the fuel and the coolant jet of the coolant in a mixing chamber, wherein:

the fuel connection of the mixer housing has a passage opening with a longitudinal axis that is coaxial with a nozzle for an outflow of the fuel-coolant mixture, and the coolant connection of the mixer housing has a receiving opening with an opening longitudinal axis, the opening longitudinal axis of the receiving opening and the longitudinal axis of the passage opening of the fuel connection being arranged at an acute angle to one another in a flow direction of the fluid jets, and an opening-in point is defined where the coolant from the receiving opening enters into the passage opening, and a first spacing from an outflow opening of the fuel connection to the opening-in point is larger than a second spacing from an injector end of an injector of the coolant connection to the opening-in point.

5. The mixing device as claimed in claim 4, characterized in that
the injector end is formed directly at the opening-in point.

6. The mixing device of claim 4, wherein the mixer housing has more than one coolant connection, and the coolant connections are formed symmetrically over a periphery of the mixer housing.

7. The mixing device of claim 1, wherein the mixing device is arranged in the fuel injection system upstream of or in a high-pressure pump that is upstream of a high-pressure line.

8. The mixing device of claim 1, wherein the mixing device is designed for delivery of the fuel that is regulated on the basis of requirement.

9. The mixing device of claim 1, wherein the mixing device has a first cross section at the passage opening of the fuel connection and the mixing chamber has a second cross section that is larger than the first cross section.

10. The mixing device claim 9, wherein the nozzle is arranged at a downstream end of the mixing device, the nozzle having a third cross section that is smaller than the second cross section.

11. The mixing device of claim 1, wherein the coolant is water.

12. The mixing device of claim 4, wherein the angle has a value between 15° and 30°.

13. The mixing device of claim 1, wherein the mixer housing has more than two coolant connections, and the coolant connections are formed symmetrically over a periphery of the mixer housing.

* * * * *